United States Patent [19]

Osada

[11] Patent Number: 4,719,894

[45] Date of Patent: Jan. 19, 1988

[54] EXHAUST GAS REFLUX APPARATUS

[75] Inventor: Akira Osada, Hamamatsu, Japan

[73] Assignee: Suzuki Jidosha Kogyo Kabushiki Kaisha, Shizuoka, Japan

[21] Appl. No.: 782,254

[22] Filed: Sep. 30, 1985

[30] Foreign Application Priority Data

Oct. 2, 1984 [JP] Japan .................. 59-206792

[51] Int. Cl.$^4$ ............................. F02M 25/06
[52] U.S. Cl. ................................. 123/571
[58] Field of Search .............. 123/568, 569, 571

[56] References Cited

U.S. PATENT DOCUMENTS

| 4,165,722 | 8/1979 | Aoyama | 123/571 |
| 4,378,776 | 4/1983 | Nishimori | 123/571 |
| 4,454,854 | 6/1984 | Gotoh et al. | 123/571 |
| 4,462,378 | 7/1984 | Atago et al. | 123/571 |
| 4,485,794 | 12/1984 | Kimberley et al. | 123/571 X |
| 4,495,929 | 1/1985 | Maeda et al. | 123/571 X |

FOREIGN PATENT DOCUMENTS 0106728 8/1979 Japan .
0106730 8/1979 Japan .
0108449 7/1982 Japan .

Primary Examiner—Willis R. Wolfe, Jr.
Attorney, Agent, or Firm—Flynn, Thiel, Boutell, & Tanis

[57] ABSTRACT

An exhaust gas reflux apparatus for an internal combustion engine. This apparatus comprises an EGR regulating valve to control the amount of exhaust gas which is refluxed into an intake system of the engine, an ignition coil to detect the rotating speed of the engine; a shift switch to detect the gear position of the change gear; a negative pressure change-over valve arranged in a negative pressure passage; and a control circuit which discriminates a high-speed and high-load operating state of the engine when the rotating speed is over a set speed and the change gear is at a set gear position on the high speed side on the basis of the detection signals from the ignition coil and shift switch. The control circuit controls the change-over valve to stop the reflux of the exhaust gas after expiration of a set time period when the high-load operating state is detected. The EGR regulating valve is thus not subjected to a high temperature for in excess of the set time period.

7 Claims, 2 Drawing Figures

EXHAUST GAS REFLUX APPARATUS

FIELD OF THE INVENTION

The present invention relates to an exhaust gas reflux apparatus and, more particularly, to an exhaust gas reflux apparatus which can prevent the reduction in function of an EGR regulating valve due to the heat of the exhaust gas which is refluxed when the operating state of the engine causes the temperature of the exhaust gas to be high.

BACKGROUND OF THE INVENTION

There is known an exhaust gas reflux apparatus in which the intake air is diluted by refluxing a part of the exhaust gas into the intake system of an internal combustion engine, and the propagation speed of the flame and the highest combustion temperature are decreased, thereby reducing the amount of NOx in the exhaust gas. In such an apparatus, the reflux quantity of the exhaust gas is controlled by an EGR regulating valve.

This EGR regulating valve is made operative using the negative pressure of the intake passage, and controls the reflux quantity in accordance with the operating state of the engine.

However, for example, when the engine experiences a high load operating state involving a high rotational engine speed, the temperature of the exhaust gas which is refluxed also becomes high. Thus, the EGR regulating valve deteriorates such that its function is lost or decreased due to burning of the valve portion and/or melting-loss of the diaphragm and the like as caused by the high temperature of the exhaust gas. Thus, the control of the reflux quantity of the exhaust gas becomes inaccurate, causing a situation such that the amount of NOx cannot be reduced. In addition, the high load operating state, wherein the temperature of the exhaust gas becomes high, can also be caused at a low rotating speed of the engine.

SUMMARY OF THE INVENTION

It is an object of the present invention to provide an exhaust gas reflux apparatus which prevents reduction in the function of an EGR regulating valve due to the heat of the exhaust gas which is refluxed into the intake system during a predetermined operating state of the engine when the temperature of the exhaust gas becomes high, thereby making it possible to improve the durability of the EGR valve and to maintain its function of reducing the quantity of NOx.

This object is accomplished by an exhaust gas reflux apparatus comprising: an EGR regulating valve for controlling a reflux amount of an exhaust gas which is refluxed into an intake system of an internal combustion engine; a spring for making the EGR regulating valve operative to reduce the reflux amount of the exhaust gas; a negative pressure chamber for making the EGR regulating valve operative to increase the reflux amount of the exhaust gas; a negative pressure change-over valve arranged in the way of a negative pressure passage which is communicated at one end with an intake passage just upstream of a throttle valve of a carburetor and which is communicated at the other end with the negative pressure chamber; an ignition coil for sensing the rotating speed of the engine; a shift switch for sensing the gear position of a change gear; and a control circuit which discriminates a high speed and high load operating state in that the rotating speed of the engine is over a set rotating speed and the change gear is at a set gear position on the high speed side on the basis of detection signals from the ignition coil and shift switch, and then switch-controls the negative pressure change-over valve in order to stop the reflux of the exhaust gas after an expiration of a set time period of the high speed and high load operating state.

According to the present invention, the control circuit controls the EGR regulating valve to stop the reflux of the exhaust gas after elapse of a set time period when the high load operating state, in that the temperature of the exhaust gas becomes high and the engine rotates at a high speed, is detected by the ignition coil and the shift switch. Due to this, the EGR regulating valve is not subjected to a high temperature except for a set time period, and it is possible to prevent deterioration in the function of the EGR regulating valve as caused by burning of the valve member, and/or melting-loss of the diaphragm and the like. Even if it is determined that the engine is in a high load operating state due to sensing signals from the ignition coil and the shift switch, but if this state is not continued beyond a set time period, then the reflux of the exhaust gas is not stopped so that the amount of NOx is reduced.

The present invention will be apparent from the following detailed description taken in conjunction with the accompanying drawings.

DETAILED DESCRIPTION

Figure 1:
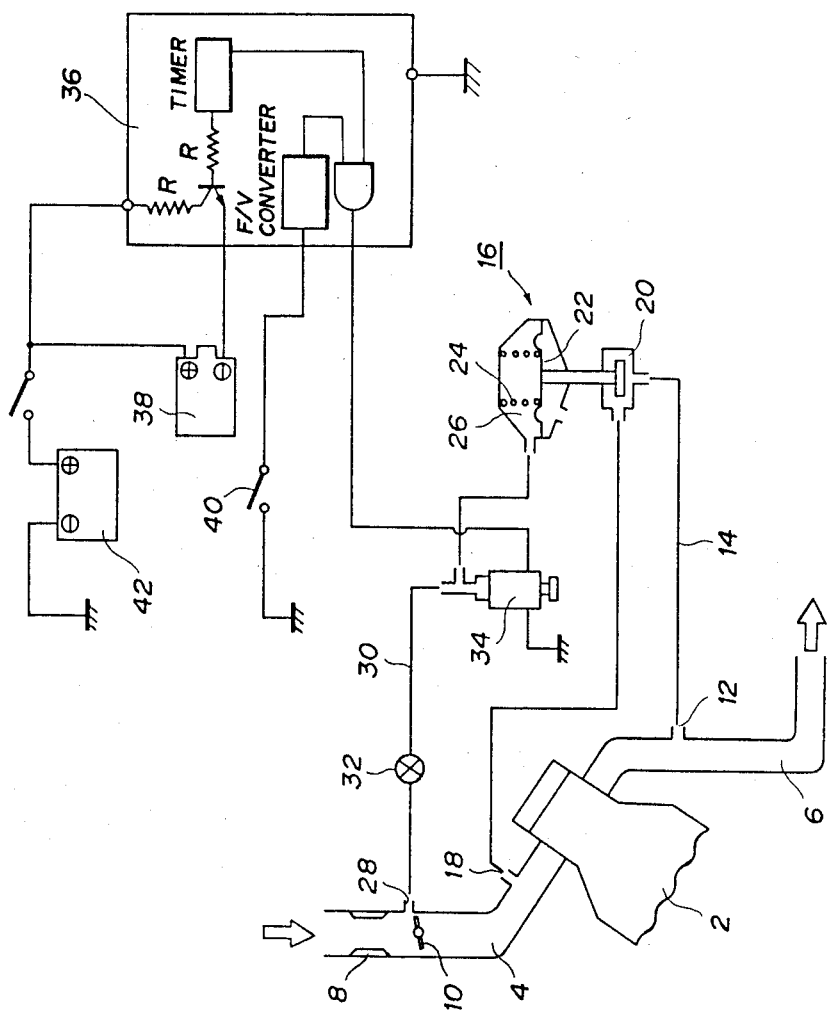
FIG. 1 is a circuit diagram to explain an embodiment of the present invention.
Figure 2:
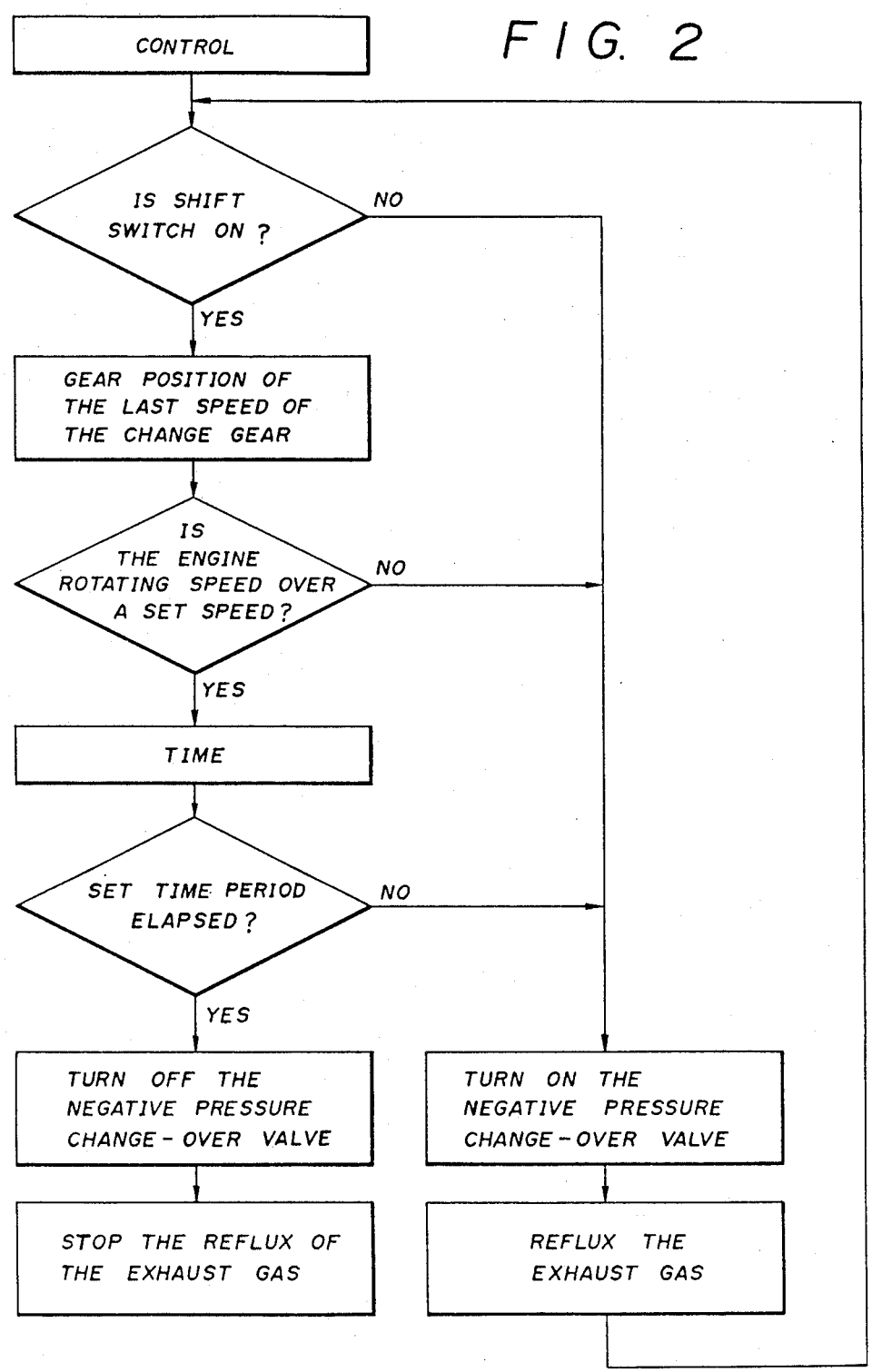
FIG. 2 is a flowchart to explain the control of the circuit of FIG. 1.

An embodiment of the present invention will now be described in detail hereinbelow with reference to the drawings. FIGS. 1 and 2 show one embodiment of the invention.

In FIG. 1, reference numeral 2 denotes an internal combustion engine; 4 is an intake passage; 6 is an exhaust passage; 8 is a carburetor; and 10 is a throttle valve.

One end of a reflux passage 14 of the exhaust gas serves as a start point and communicates with an intake port 12 formed in the exhaust passage 6. The other end of the reflux passage 14 serves as an end point and communicates with a reflux port 18 formed in the intake passage 4 through an EGR regulating valve 16.

The EGR regulating valve 16 comprises a valve member 20 to open or close the reflux passage 14; a diaphragm 22 operatively coupled with the valve member 20 to make this valve member operative; a spring 24 to cause the diaphragm 22 to be deformed in order to make the valve member 20 operative in the direction so as to close the reflux passage 14 and thereby reduce the reflux quantity of the exhaust gas; and a negative chamber 26 defined above the diaphragm 22. One end of a negative pressure passage 30 communicates with the negative pressure chamber 26 and the other end communicates with a negative pressure port 28 formed in the intake passage 4 just upstream of the carburetor throttle valve 10. Thus, the negative pressure is led into the negative pressure chamber 26 through the negative pressure passage 30. Due to this negative pressure, the diaphragm 22 is deformed upwardly so as to make the valve member 20 operative to open the reflux passage 14 and thereby increase the reflux amount of the exhaust gas.

A temperature sensing valve 32 to detect the temperature of the cooling water (or coolant) of the engine 2 and a negative pressure change-over valve 34 are associated with the negative pressure passage 30. The valve 32 closes the passage 30 when the temperature of the coolant is lower than a predetermined temperature. On the contrary, when the temperature exceeds the predetermined value, then the valve 32 opens the passage 30. In this way, the operation of the EGR regulating valve 16 is controlled, thereby improving the running and operating efficiencies in the state whereby the coolant temperature is low.

The negative pressure change-over valve 34 is connected to a control circuit 36 and controls the propagation of the negative pressure through passage 30 into the negative pressure chamber 26 of the EGR regulating valve 16. An ignition coil 38 and a shift switch 40 are connected to the control circuit 36. The ignition coil 38 detects at least the rotating speed of the engine 2 in order to detect the operating state of the engine. The shift switch 40 detects the gear position of the transmission or change gear (not shown). In this embodiment, it detects the gear position of the last speed on the high speed side. Although not shown, a sensor to detect the degree of opening of the throttle valve 10 may be provided to detect the operating state of the engine. A signal indicative that the engine rotating speed is over a set speed is generated from the ignition coil 38. A signal representative of the gear position of the final speed of the change gear is generated from the shift switch 40. These signals are inputted to the control circuit 36, and the control circuit 36 discriminates the high speed and high load operating state of the engine, during which state the temperature of the exhaust gas becomes high. After expiration of a set time period in this operating state, the control circuit 36 closes the change-over valve 34 to stop the propagation of the negative pressure through the passage 30 into the negative pressure chamber 26. In this way, spring 24 closes the valve 20 and the EGR regulating valve 16 stops the reflux of the exhaust gas. In the case where only either one of those signals is inputted or none of them is inputted to the control circuit 36, or until a set time period elapses even if both of those signals are inputted, the control circuit 36 maintains the valve 34 in an open condition so as to allow the negative pressure in passage 30 to be propagated into the negative pressure chamber 26. Also, the EGR regulating valve 16 controls the reflux amount of the exhaust gas and allows the exhaust gas to be refluxed. The numeral 42 denotes a battery.

OPERATION

The operation of the reflux apparatus of this embodiment will then be explained.

In the starting operation when the engine is cool, the negative pressure passage 30 is closed by way of the temperature sensing valve 32 as mentioned above, so that no negative pressure is propagated through passage 30 and the EGR regulating valve 16 closes the valve member 20 by means of the spring 24, thereby closing the reflux passage 14. Thus, the reflux of the exhaust gas is stopped and the running operating efficiency when the coolant temperature is low is improved.

When the coolant temperature exceeds a preset temperature, the valve 32 opens and allows the negative pressure passage 30 to be communicated. In this case, the passage 30 is also provided with the negative pressure change-over valve 34 which is switched by the control circuit 36. As shown in the following table and FIG. 2, the valve 34 is closed by the control circuit 36 after expiration of a predetermined time period when the engine operating state is such that the foregoing signals, indicative of the rotating speed over a set speed and the gear position of the final speed of the change gear are inputted to the control circuit 36 to thereby stop the reflux of the exhaust gas.

| | ROTATING SPEED OF THE ENGINE | |
|---|---|---|
| SHIFT SWITCH | LOWER THAN A SET ROTATING SPEED | OVER A SET ROTATING SPEED |
| ON | ON | ON WITHIN A SET TIME PERIOD/OFF AFTER AN EXPIRATION OF A SET TIME PERIOD |
| OFF | ON | ON |

That is, to prevent deterioration of the function of the EGR regulating valve 16 due to the heat of the exhaust gas in the high speed and high load operating state of the engine, in which state the temperature of the exhaust gas becomes high, the reflux of the exhaust gas is stopped after expiration of a predetermined or set time period when in this operating state of the engine. This thereby avoids the burning of the valve member 20 and prevents deterioration in the functioning of the valve 16.

In the case where neither or only either one (but not both) of the above-mentioned signals is inputted to the control circuit 36, or until a predetermined time period elapses when both signals are inputted, the change-over valve 34 is opened by the control circuit 36 and the exhaust gas is controlled by the valve 16 and is refluxed.

As described above, since the reflux of the exhaust gas is stopped after expiration of a set time period when it is determined that an engine operating state exists in which the temperature of the exhaust gas becomes high, the EGR regulating valve 16 is thus not subjected to the high temperature for a time interval over or in excess of said set time period. Thus, problems such as burning of the valve member 20, melting-loss of the diaphragm 22 and the like are not caused. Therefore, the durability of the EGR regulating valve 16 is improved and its function of reducing the quantity of NOx can be maintained. Although the high load operating state of the engine, in which the temperature of the exhaust gas becomes high, has been described with respect to an operating state involving a high rotating speed of the engine, such a situation can also be caused at a low rotating speed of the engine. Therefore, by sensing the engine operating state in which the exhaust gas temperature becomes high irrespective of the high or low rotating speed, the reflux of the exhaust gas is stopped after elapse of a set time period, and due to this, a similar effect can be derived.

As described above, according to the present invention, when a predetermined operating state of the engine in which the temperature of the exhaust gas becomes high, for example a high load operating state in which the engine rotates at a high speed, is sensed or determined, the reflux of the exhaust gas is stopped after expiration of a set time period, thereby preventing the EGR regulating valve from being subjected to the high temperature for a time interval in excess of said set time period. Thus, burning of the valve member, melting-loss of the diaphragm and the like are avoided, and deterioration in the proper functioning of the valve 16 can be prevented. Consequently, the durability of the valve 16 can be improved and the deterioration of its function (i.e. reduction of the quantity of NOx) due to a time-dependent change is suppressed. The NOx reducing function of valve 16 can thus be maintained. Also, the quantity of NOx can be decreased.

The EGR regulating valve can hence be formed of a material having a heat-resistant temperature lower than a conventional one, so that this contributes to a reduction of cost.

The present invention is not limited to the foregoing embodiment but many modifications and variations are possible within the spirit and scope of the appended claims.

What is claimed is:

1. An exhaust gas reflux apparatus comprising:
   EGR regulating valve means for controlling a reflux amount of an exhaust gas which is refluxed into an intake system of an internal combustion engine; having at least two operating states;
   sensing means for sensing the operating state of said engine;
   first control means responsive to said sensing means for detecting the start of a predetermined one of said operating states of the engine, in which the temperature of the exhaust gas becomes high;
   timer means responsive to detection by said first control means of the start of said predetermined operating state for measuring a time delay, said time delay beginning immediately after and only in response to said detection of the start of said predetermined operating state and expiring a predetermined time interval thereafter; and
   second control means responsive to said timer means for controlling said EGR regulating valve means to stop the reflux of said exhaust gas immediately after expiration of said predetermined time interval.

2. An exhaust gas reflux apparatus according to claim 1, wherein said sensing means detects the rotating speed of the engine.

3. An exhaust gas reflux apparatus according to claim 1, wherein said sensing means detects the gear position of a change gear for the engine.

4. An exhaust gas reflux apparatus according to claim 2, wherein said sensing means is an ignition coil which generates a detection signal when the rotating speed of the engine exceeds a predetermined rotational speed.

5. An exhaust gas reflux apparatus according to claim 3, wherein said sensing means is a shift switch which generates a detection signal indicative of the gear position of the last speed of said change gear.

6. An exhaust gas reflux apparatus for an internal combustion engine having at least two operating states, comprising:
   an exhaust gas reflux passage which communicates at one end with an exhaust passage and at the other end with an intake system of the engine;
   an EGR regulating valve for controlling a reflux amount of an exhaust gas which is refluxed through the reflux passage into the intake system of the engine;
   biasing means for urging said EGR regulating valve in a closing direction for reducing the reflux amount of the exhaust gas;
   a negative pressure chamber for urging said EGR regulating valve in a opening direction for increasing the reflux amount of the exhaust gas;
   a negative pressure passage which communicates at one end with an intake passage just upstream of a throttle valve of a carburetor and which communicates at the other end with said negative pressure chamber;
   a negative pressure change-over valve associated with said negative pressure passage for controlling opening and closing thereof;
   first sensing means for sensing the rotational speed of the engine;
   second sensing means for sensing the gear position of a change gear for the engine; and
   first control means responsive to said first and second sensing means for detecting the start of a high-speed and high-load operating state which is one of said operating states of said engine and in which the rotational speed of the engine exceeds a set rotational speed and the change gear is in a set gear position on the high speed side;
   timer means responsive to detection by said first control means of the start of said predetermined operating state for measuring a time delay, said time delay beginning immediately after and only in response to said detection of the start of said predetermined operating state and expiring a predetermined time interval thereafter; and
   second control means responsive to said timer means for switching said negative pressure change-over valve into a closed position to stop the reflux of said exhaust gas immediately after expiration of said predetermined time interval.

7. An exhaust gas reflux apparatus according to claim 6, wherein said biasing means is a spring, said first sensing means is an ignition coil which generates a detection signal when the rotational speed of the engine exceeds a predetermined rotational speed, and said second sensing means is a shift switch which generates a detection signal indicative of the gear position of the last speed of said change gear.

* * * * *

UNITED STATES PATENT AND TRADEMARK OFFICE
CERTIFICATE OF CORRECTION

PATENT NO. : 4 719 894

DATED : January 19, 1988

INVENTOR(S) : Akira OSADA

It is certified that error appears in the above-identified patent and that said Letters Patent is hereby corrected as shown below:

Column 5, line 23; delete ";".

Signed and Sealed this

Sixteenth Day of August, 1988

Attest:

DONALD J. QUIGG

Attesting Officer  Commissioner of Patents and Trademarks